United States Patent [19]

Ko

[11] Patent Number: 5,153,055
[45] Date of Patent: Oct. 6, 1992

[54] FIRE-FIGHTING APPLIANCE

[76] Inventor: Tse-Hao Ko, 3rd Fl., No. 18, Lane 5, Lung-Chuan St., Taipei City, Taiwan

[21] Appl. No.: 780,213

[22] Filed: Oct. 22, 1991

[51] Int. Cl.$^5$ .................... B27N 9/00; B32B 15/04
[52] U.S. Cl. .................... 428/224; 428/225; 428/285; 428/408; 428/920; 428/921; 428/286; 428/287; 428/298; 2/8
[58] Field of Search .............. 428/224, 251, 285, 920, 428/921, 408; 2/8

[56] References Cited

U.S. PATENT DOCUMENTS 4,980,228 12/1990 La Marca, II et al. ............. 428/251

Primary Examiner—George F. Lesmes
Assistant Examiner—Kathryne Shelborne
Attorney, Agent, or Firm—Oblon, Spivak, McClelland, Maier & Neustadt

[57] ABSTRACT

A fire-fighting appliance is constructed of a sheetlike material modularly designed to include an outer fire-retardant, heat-reflecting, and waterproof component, and an inner fire-retardant, insulating component. The outer component is formed of either covered on the outside with a layer or heat reflecting flexible metal or flexible metal alloy attached thereto, or a composite layer including either (1) a layer of woven oxidized fiber and a heat-reflecting, waterproof layer of flexible metal or flexible metal alloy affixed to the outer surface thereof, or (2) a layer of woven oxidized fiber and a layer of waterproof plastic affixed to or adjoining the inner surface thereof, or (3) a layer of woven oxidized fiber and a heat-reflecting, waterproof layer of flexible metal or metal alloy affixed to the outer surface thereof and a layer of waterproof plastic affixed to or adjoining the inner surface thereof. The inner component is formed of an insulating layer of oxidized fiber, other fiber-retardant fiber or a combination of oxidized fibers and other fire-retardant fibers, and a fabric layer which serves as a lining to protect the inner surface of the insulation.

18 Claims, 2 Drawing Sheets

FIRE-FIGHTING APPLIANCE

BACKGROUND OF THE INVENTION

1. Field of the Invention

This invention relates to an appliance for use in high-temperature environments such as but not limited to fire-fighting, more particularly to an article of clothing for fire fighters.

2. Description of the Related Art

Up to the present, fire-retardant cloths were generally formed of Nomex or PBI fiber, which are themselves fire-retardant to begin with, or of fibers which must be pretreated with various chemical agents in order to be fire-retardant, such as synthetic fibers, such as Nylon, polyester fiber, acrylonitrile fiber, rayon, and other synthetic fibers, or natural fibers, including cotton, wool, and other natural fibers. Appliances for fire-fighting, including numerous clothing articles, such as suits, pants jackets, boots and gloves used for protecting an individual when fighting a fire, are constructed of these fire-retardant cloths. However, such fire-fighting appliances suffer from the following disadvantages:

(1) Because such appliances are made of a fire-retardant material, rather than a nonflammable material, said appliances will catch fire when exposed to flames or substantial temperature for any significant length of time.

(2) Such fire-fighting appliances cannot protect an individual for any extended length of time from the heat produced from flames or substantial temperature, such as those encountered when fighting a fire.

(3) Upon repeated contact with water the fire-retardant qualities of the fire-fighting appliance will deteriorate, as fire-retarding chemical agents are gradually leached out.

Currently used fire-retardant fibers, such as Nomex, the most popular, are not fireproof, and have relatively low melting points. It is an object of this invention to provide an improved class fire-retardant cloths, which are believed to represent a significant improvement over material previously used for clothing articles of this general type. For example, Nomex melts at temperature of only 300°–400° C., whereas oxidized fibers have been tested up to 940° C. and have no known melting point. Furthermore, oxidized fibers will not catch fire.

SUMMARY OF THE INVENTION

A main object of this invention to provide a fire-fighting appliance which is constructed from a sheet-like fireproof material including a layer of oxidized fiber, which is a nonflammable material. There are three types of materials specified herein. The first type uses a composite outer layer composed of an outer thin layer of water proof, heat-reflecting metal bonded to an inner layer of oxidized fiber, and an inner layer of an insulating material which may be either oxidized fiber or an insulating cloth made of other synthetic fibers or natural fibers or a combination thereof. The second type uses an outer layer of oxidized fiber, a middle layer of plastic for waterproofing, and an inner layer of insulating material, which may be either oxidized fiber or another synthetic or natural fiber, or a combination thereof. The third type combines the construction methods of the first and second types, with a composite outer sheet composed of an outer thin layer of water-proof, heat-reflecting metal bonded to an inner layer of oxidized fiber, a middle sheet of plastic for further waterproofing, and an inner sheet of insulating material, which may be either oxidized fiber or another synthetic or natural fiber, or a combination thereof. These three types of constructions derive their water-proof qualities from the metal and the plastic layers, respectively, and each type derives fire-proof qualities from the oxidized fiber in combination with other layers. They also have heat-insulation properties derived in the case of the first type from the metal, oxidized fiber, and insulation layers, and in the case of the second type from the oxidized fibers and insulation layers. In the case of the first and third types, the metal layer further provides a heat-reflecting property adding to the protective quality of the appliance.

BRIEF DESCRIPTION OF THE DRAWINGS

Other features and advantages of this invention will become apparent in the following detailed description of the preferred embodiments of this invention with reference to the accompanying drawings, in which.

In this invention, certain terms are used which are defined as follows: Outer refers to the side adjoining or closer to the high temperature from which insulation is needed. Inner refers to the side or surface adjoining or closer to the object or person being protected or insulated from the high temperatures.

DETAILED DESCRIPTION OF THE PREFERRED EMBODIMENTS

Figure 2:
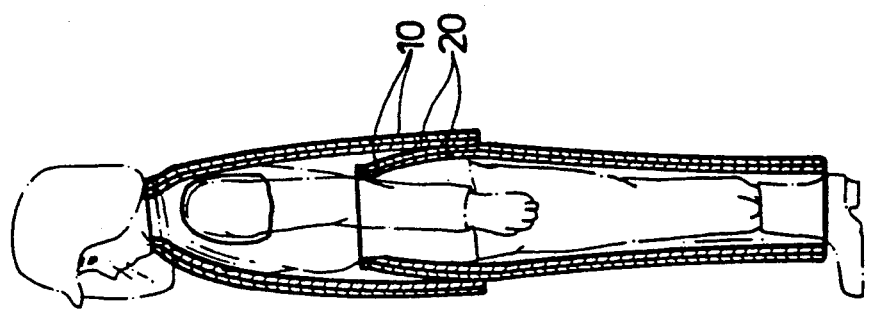
FIG. 2 is a schematic view of another preferred embodiment of a fire-fighting appliance of this invention.
Figure 1:
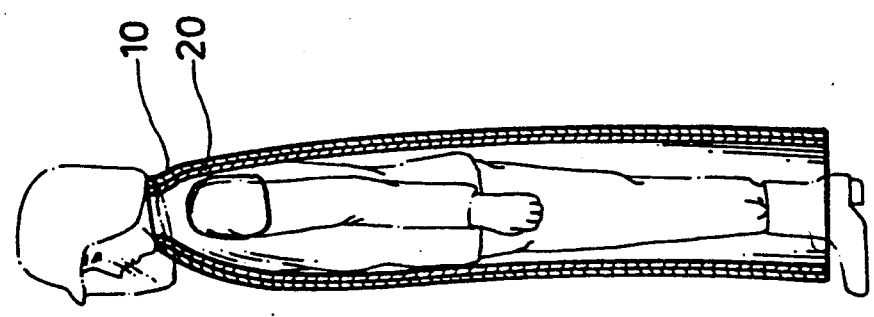
FIG. 1 is a schematic view of a preferred embodiment of a fire-fighting appliance of this invention.

FIG. 1 shows a preferred embodiment of a fire-fighting appliance of this invention. The fire-fighting appliance shown is a fire-fighting jacket, however, it may be in the form of a suit as shown in FIG. 2. The fire-fighting appliance is constructed from a sheetlike material including a first and a second layer 10 and 20.

Figure 3:
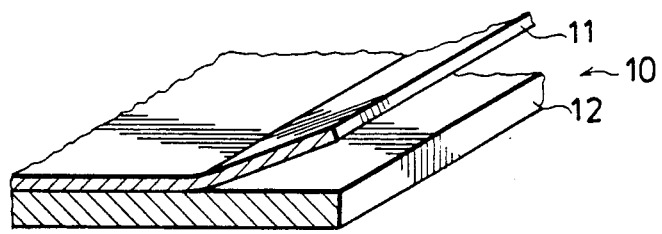
FIG. 3 is a fragmentary sectional schematic view showing the outer layer 10 of the first type of fireproof material specified in this invention; this outer layer 10 includes a metal component 11 bonded to an oxidized fiber component 12.

The first layer of the first type is a sheetlike material 10 which includes a layer of oxidized fiber 12 having a layer of metal 11 attached thereto by means of an electroplating process or an adhesive, as shown in FIG. 3. The metal layer 11 is preferably made of aluminum, copper, tin, zinc or other metal material. Most preferably, the metal layer 11 is made of aluminum. The metal layer 11 preferably has a thickness in the range of about 0.0001 mm to about 0.1 cm. The oxidized fiber layer 12 is formed of oxidized fibers by a weaving or nonweaving method. Alternatively, the oxidized fiber layer 12 is formed by mixing Nomex, natural fibers which are pretreated to be fire-retardant, synthetic fiber which are pretreated to be fire-retardant, or a combination of some or all of these, with oxidized fibers.

Figure 4:
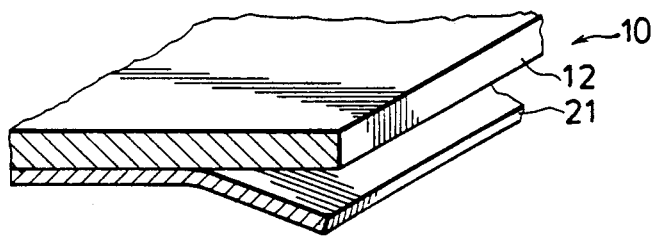
FIG. 4 is a fragmentary sectional schematic view showing the outer layer 10 of the second type of the fire-fighting appliance of this invention; this layer 10 includes an oxidized fiber component 12 and a separate plastic component 21.

The first layer of the second type, shown in FIG. 4, is composed of two separated parts, namely, a plastic layer 21 for waterproofing purposes, and an outer layer 12 made of oxidized fibers for fireproofing or, alternatively, or a mixture of Nomex, natural fibers which are pretreated to be fire-retardant, synthetic fibers which are pretreated to be fire-retardant, or a combination of some or all these, with oxidized fibers.

Figure 5:
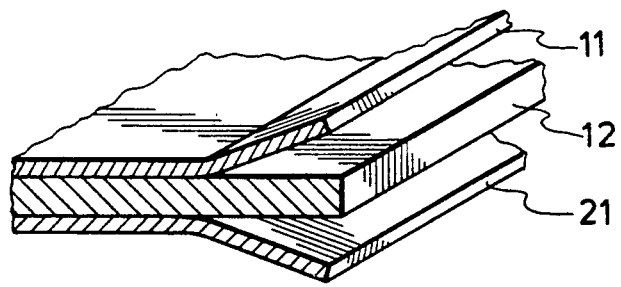
FIG. 5 is a fragmentary sectional schematic view showing the outer layer 10 of the third type of the fire-fighting appliance of this invention; this layer 10 includes a metal component 11 bonded to an oxidized fiber component 12, and a separate plastic component 21.

The first layer 10 of the third type, shown in FIG. 5, is composed of three separate parts, namely, an inner plastic layer 21 for waterproofing purposes, a middle layer 12 of oxidized fibers, and an outer 11 of metal attached to the middle layer by means of an electroplating process or an adhesive. The metal layer 11 is preferably made of aluminum, copper, tin, zinc, or other metal material. Most preferably, the metal layer 11 is made of aluminum. The metal layer 11 preferably has a thickness in the range of about 0.001 mm to about 0.1 cm. The oxidized fiber layer 12 is formed of oxidized fibers manufactured by a weaving or non-weaving method. Alternatively, the oxidized fiber layer 12 is formed by mixing Nomex, natural fibers which are treated to be fire-retardant, synthetic fibers which are treated to be fire-retardant, or a combination of some or all of these, with oxidized fibers. The plastic layer 21 may be attached to the middle layer by a bonding process, adhesive, or other method of attachment, or may be an independent layer not attached to the middle layer.

The oxidized fibers, namely, stabilized fibers, preoxidizing fibers, stabilized PAN fibers or PAN-based non-burning fibers, are manufactured by heating polyacrylonitrile or acrylic fibers which have chemical composition of more than 80% acrylonitrile in a temperature ranging from 180° to 400° C. for a period of time. To reduce the manufacturing time, the polyacrylonitrile fibers may be pretreated with an oxidant before the heating process.

The oxidized fiber resulting from this process is black in color and has carbon content exceeding 50%. The density of the oxidized fiber is 1.35 to 1.55 g/cm$^3$. The oxygen content of the oxidized is 6 to 20%, so that said oxidized fiber is fireproof. In addition, the oxidized fiber has no degradation point and melting point so it will not burn in flames, and will become red in flames of up to 940° C., turning black again when it leaves flames. Therefore, it is clear that for practical purposes the resulting oxidized fiber is a completely non-burning and nonflammable fiber. The elongation of the oxidized fiber ranges from about 0.5 to 25%, so it has the characters of textile materials. Therefore, the oxidized fiber can be mixed with Nomex fiber or fireproof-treated natural fibers, synthetic fibers or a combination these, and woven into a textile, reducing the total cost. It is found that the hygroscopicity of the oxidized fiber is far better than that of other synthetic fibers, such as Nomex, polyester fibers, acrylonitrile fibers, nylon, etc. Therefore, the oxidized fiber can be woven into a textile to be used as a good lining of fire-fighting cloth article because of their excellent ability to absorb a wearer's sweat, enhancing the comfort of the user.

Figure 6:
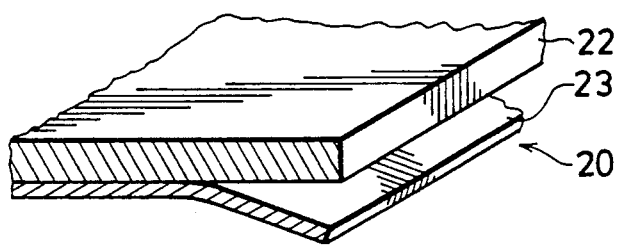
FIG. 6 is a fragmentary sectional schematic view showing the inner layer 20, which is composed of a layer of either oxidized fiber, synthetic or natural fibers treated with chemical agents for fireproofing, Nomex, or a combination of these 22 and an innermost layer of thin cloth 23 to serve as a liner.

FIG. 6 shows the second layer 20 of the sheetlike material, which is composed of oxidized fiber. This second layer of oxidized fiber 22 preferably has a thickness in the range of 0.1 mm to 10 cm. While using pure oxidized fibers is considered the ideal choice, the second layer of oxidized fiber 22 may be an nonwoven textile mixed with Nomex or with fire-retardant-treated natural fibers, fire-retardant synthetic fibers or a combination of these in order to reduce the total cost. A layer of cloth 23 is sewed or affixed to the second layer of oxidized fiber 22, severing as a lining of the fire-proof clothing article. The cloth layer 23 may be made of natural fibers, synthetic fibers, oxidized fibers or a combination of some or all of these. The main function of this innermost layer of cloth, the liner 23, are to absorb perspiration, provide comfort for the wearer, and protect the inner layer of insulation from degradation.

The two layers mentioned above as 10 and 20, which are outer and inner layers, respectively, are constructed as independent components. This allows for convenient repairs to or cleaning of either component, as well as providing the wearer the option of using the garment without its inner insulating component, in those situations where that inner component is not necessary.

It is found that the fire-proof made of the sheetlike material of this invention is fireproof, heat-insulated and waterproof and is superior to conventional fire-proof garment. The sheet-like material of this invention can be made into glove, boots, pants, etc. for use in high temperature situations such as fire fighting, high-temperature forging, steel making, and other such environment where fire-proof and insulating materials can be used to advantage.

With this invention thus explained, it is apparent that numerous modifications and variations can be made without departing from the scope and spirit of this invention. It is therefore intended that this invention be limited only as indicated in the appended claims.

I claim:
1. A composite fabric comprising:
   i) an external layer comprising
      a) an outer layer of heat-reflecting metal; and,
      b) an inner layer of oxidized fibers, wherein layer a is bonded to layer b; and
   ii) an internal layer comprising an insulating material; wherein said oxidized fibers are prepared by heating polyacrylonitrile, or acrylic fibers.
2. An article of clothing for fire-fighting, wherein said article of clothing is constructed from the composite fabric of claim 1.
3. The composite fabric of claim 1 wherein said heat-reflecting metal has a thickness of from 0.001 mm to 0.1 cm.
4. The composite fabric of claim 1 wherein said oxidized fibers are prepared by heating polyacrylonitrile or acrylic fiber having a chemical composition of more than 80% acrylonitrile at a temperature of from 180°–400° C.
5. The composite fabric of claim 1 wherein said oxidized fibers have a carbon content exceeding 50%.
6. The composite fabric of claim 1 wherein said oxidized fibers have a density of 1.35–1.55 g/cm$^3$.
7. A composite fabric comprising:
   i) an external layer of oxidized fibers;
   ii) a middle layer of waterproof plastic; and, iii) an internal layer of insulating material; wherein said oxidized fibers are prepared by heating polyacrylonitrile, or acrylic fibers.

8. An article of clothing for fire-fighting, wherein said article of clothing is constructed from the composite fabric of claim 7.

9. The composite fabric of claim 7 wherein said heat-reflecting metal has a thickness of from 0.001 mm to 0.1 cm.

10. The composite fabric of claim 7 wherein said oxidized fibers are prepared by heating polyacrylonitrile or acrylic fiber having a chemical composition of more than 80% acrylonitrile at a temperature of from 180°–400° C.

11. The composite fabric of claim 7 wherein said oxidized fibers have a carbon content exceeding 50%.

12. The composite fabric of claim 7 wherein said oxidized fibers have a density of 1.35–1.55 g/cm$^3$.

13. A composite fabric comprising:
   i) an external layer comprising:
      a) an outer layer of heat-reflecting metal; and,
      b) an inner layer of oxidized fibers, wherein layer a is bonded to layer b;
   ii) a middle layer of waterproof plastic; and,
   iii) an internal layer of insulating material; wherein said oxidized fibers are prepared by heating polyacrylonitrile, or acrylic fibers.

14. An article of clothing for fire-fighting, wherein said article of clothing is constructed from the composite fabric of claim 13.

15. The composite fabric of claim 13 wherein said heat-reflecting metal has a thickness of from 0.001 mm to 0.1 cm.

16. The composite fabric of claim 13 wherein said oxidized fibers are prepared by heating polyacrylonitrile or acrylic fiber having a chemical composition of more than 80% acrylonitrile at a temperature of from 180°–400° C.

17. The composite fabric of claim 13 wherein said oxidized fibers have a carbon content exceeding 50%.

18. The composite fabric of claim 13 wherein said oxidized fibers have a density of 1.35–1.55 g/cm$^3$.

* * * * *